United States Patent
Barsness et al.

(10) Patent No.: US 7,974,955 B2
(45) Date of Patent: Jul. 5, 2011

(54) INHIBITING NON-CRITICAL ACCESS BASED ON MEASURED PERFORMANCE IN A DATABASE SYSTEM

(75) Inventors: Eric Lawrence Barsness, Pine Island, MN (US); Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1761 days.

(21) Appl. No.: 10/948,774

(22) Filed: Sep. 23, 2004

(65) Prior Publication Data
US 2006/0064426 A1    Mar. 23, 2006

(51) Int. Cl.
*G06F 7/00* (2006.01)
*G06F 17/00* (2006.01)

(52) U.S. Cl. ........ 707/687; 707/690; 707/692; 707/694; 707/703

(58) Field of Classification Search .................. 707/100, 707/204
See application file for complete search history.

(56) References Cited

U.S. PATENT DOCUMENTS

| | | | |
|---|---|---|---|
| 5,175,849 A * | 12/1992 | Schneider | 707/202 |
| 6,282,570 B1 * | 8/2001 | Leung et al. | |
| 7,058,622 B1 * | 6/2006 | Tedesco | 707/2 |
| 7,085,786 B2 * | 8/2006 | Carlson et al. | 707/204 |
| 2002/0133529 A1 * | 9/2002 | Schmidt | 709/102 |
| 2003/0043213 A1 * | 3/2003 | Finley et al. | 345/856 |
| 2004/0107219 A1 * | 6/2004 | Rosenberger | 707/104.1 |

* cited by examiner

*Primary Examiner* — John Breene
*Assistant Examiner* — Hares Jami
(74) *Attorney, Agent, or Firm* — Martin & Associates, LLC; Bret J. Petersen (57) ABSTRACT

A database system has a contention monitor which determines when the level of contention for accessing or inserting records in the database rises above a threshold, and inhibits non-critical access to the database to reduce the level of contention. In a preferred embodiment, the level of contention is determined by periodically measuring the time for an INSERT operation on the database, and comparing the time to a threshold derived from a baseline time measurement for the operation during a time of normal database activity. Thus the contention level is inferred from the time to do the operation, in this case the INSERT query. In one embodiment, the contention monitor notifies a system administrator to take action to reduce the contention. In another embodiment, the contention monitor informs the system to take action automatically according to predetermined selections by the system administrator.

43 Claims, 4 Drawing Sheets

FIG. 1

Select * from MyTable
where StoreID = 001 and CustID in (5,7)

FIG. 2

MyTable 300

| StoreID | CustID | CustStatus | | Other Columns |
|---------|--------|------------|---|---------------|
| 001 | 7 | A | | ... |
| 002 | 3 | A | | ... |
| 001 | 5 | E | | ... |
| 001 | 4 | A | | ... |
| 001 | 1 | A | | ... |
| 002 | 5 | D | | ... |
| 001 | 2 | A | | ... |
| 001 | 8 | A | | ... |
| 002 | 7 | E | | ... |
| 002 | 9 | D | | ... |

INHIBITING NON-CRITICAL ACCESS BASED ON MEASURED PERFORMANCE IN A DATABASE SYSTEM

BACKGROUND OF THE INVENTION

1. Technical Field

This invention generally relates to computer systems, and more specifically relates to access in a computer database system.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result. A type of query that accesses the database is INSERT data. Data is typically added to the database using an INSERT. When a job inserts data into the database the database locks out access to other jobs. Contention occurs when one or more jobs attempt to access data that has been locked.

In a large data warehousing environment, real time data querying is very important. When a large number of jobs need to insert and/or access the data at the same time, contention on the database rises, and the time to make the inserts become excessive. The contention may be caused by not only the INSERT jobs but the other parts of the application that are querying and updating the data in real time from user input. In some applications, the jobs that are inserting records to the file are critical and cannot fall behind in processing the incoming data. Simply adding more jobs to make the inserts is not effective because it would merely increase the contention. Without a way to reduce database contention to improve system performance, the computer industry will continue to suffer from excessive delays in database accesses caused by contention in the database.

DISCLOSURE OF INVENTION

The present invention provides optimized access to a computer database system by suspending or delaying non-critical access when contention on the database is high based on a measured parameter of the database.

According to the preferred embodiments, a database system has a contention monitor which determines when the level of contention for accessing or inserting records in the database rises above a threshold, and inhibits non-critical access to the database to reduce the level of contention. In a preferred embodiment, the level of contention is determined by periodically measuring the time for an INSERT operation on the database, and comparing the time to a threshold derived from a baseline time measurement for the operation during a time of normal database activity. Thus the contention level is inferred from the time to do the operation, in this case the INSERT query. In one embodiment, the contention monitor notifies a system administrator to take action to reduce the contention. In another embodiment, the contention monitor informs the system to take action automatically according to predetermined selections by the system administrator.

An advantage of the present invention is that it allows the database system to give priority to system-critical accesses in a high volume database environment when contentions may rise to such high levels that would otherwise adversely affect the performance of these critical accesses.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figure 2:
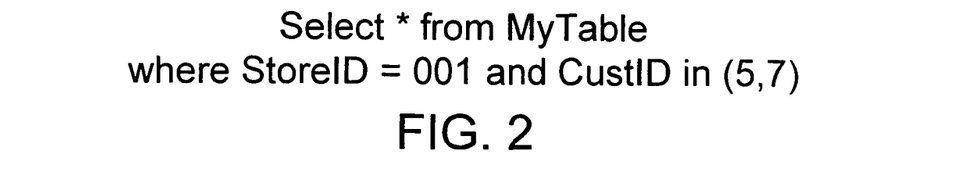
FIG. 2 shows a sample database query in Structured Query Language (SQL) for the database table shown in FIG. 3.
Figure 3:
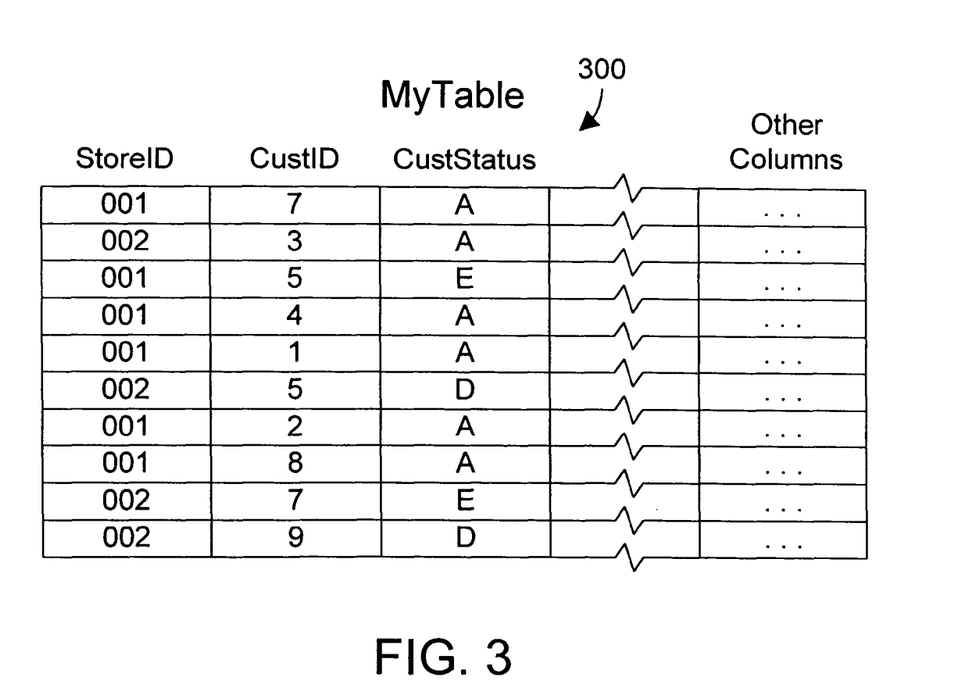
FIG. 3 shows a sample database table.

One popular way to define a query uses Structured Query Language (SQL). SQL defines a syntax for generating and processing queries that is independent of the actual structure and format of the database. One sample SQL query is shown in FIG. 2. The "select *" statement tells the database query processor to select all values, the "from MyTable" statement identifies which database table to search, and the "where" clause specifies one or more expressions that must be satisfied for a record to be included in the resulting dataset. Note that the query of FIG. 2 is expressed in terms of columns StoreID and CustID, which are columns defined on the database table MyTable 300 shown in FIG. 3. MyTable 300 is a suitable table that the query of FIG. 2 could be run against. MyTable 300 includes multiple rows and multiple columns. Information about the internal storage of the data is not required as long as the query is written in terms of expressions that relate to values in columns from tables.

2.0 Description of the Preferred Embodiments

The present invention provides a database system with a contention monitor that determines when the level of contention for accessing or inserting records in the database rises above an acceptable threshold, and inhibits some non-critical access to the database to reduce the level of contention. One type of non-critical access is low-priority application level functions. Application level functions mean parts or features of a database application such as those typically accessed by the user, and is not limited to software function calls.

In the preferred embodiments, the term "non-critical access" refers to any access to the database that may be inhibited. Inhibiting a database access, as used herein, may include shutting down, suspending, delaying, or otherwise inhibiting normal execution of the database access.

Figure 1:
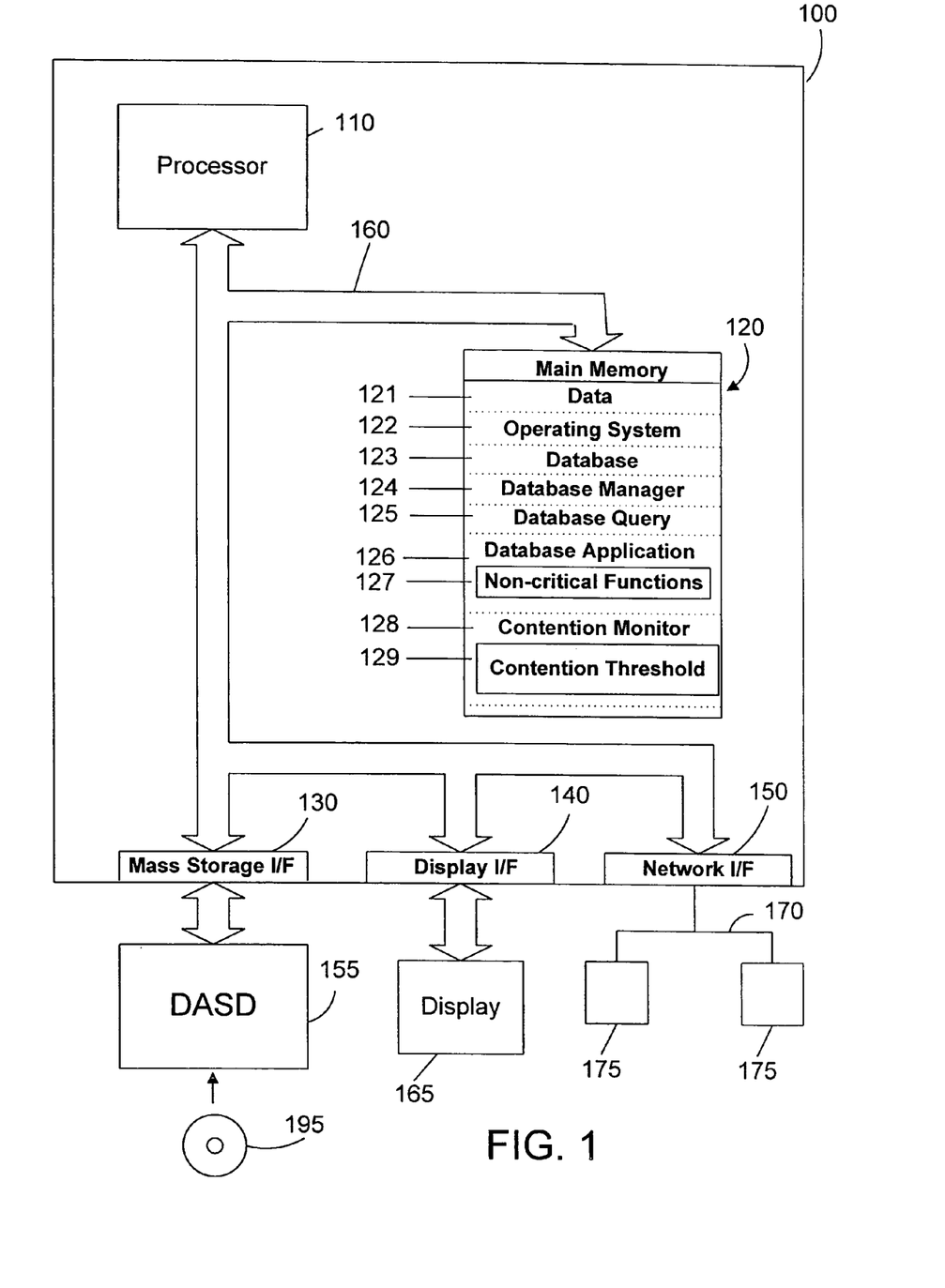
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 124, one or more database queries 125, a database application program 126 which has one or more non-critical functions 127, and a contention monitor 128 which has a contention threshold 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more tables. Database manager 124 provides an interface to database 123, processing queries and returning the query results. Database query 125 is a query in a format compatible with the database 123 that allows retrieval of information stored in the database 123 that satisfies the database query 125.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 124, database query 125, database application 126, and the contention monitor 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol. The database described above may be distributed across the network, and may not reside in the same place as the application software accessing the database. In a preferred embodiment, the database primarily resides in a host computer and is accessed by remote computers on the network which are running an application with an internet type browser interface over the network to access the database.

Again referring to FIG. 1, computer system 100 is shown with a contention monitor 128 in memory 120 in accordance with preferred embodiments of the invention. In a first preferred embodiment, contention monitor 128 is a program that runs independently in memory 120 to monitor the status of the database 123. Contention monitor 128 first determines how long an update, delete, insert or other operation on the database takes as a baseline for the contention level at normal operating levels to use as a reference. Measuring the time for the completion of one of these operations may not actually measure the contention level directly, but the contention level may be inferred using this method. A contention threshold 129 is then determined using the baseline time, some multiplication factor, some historical measurement, or other appropriate heuristic. The factor or heuristic may include input from the user to set the value of the contention threshold 129.

The contention monitor 128 wakes up periodically or is activated periodically to monitor contention on the database 123. When the contention level is deemed to be too high, i.e. higher than the contention threshold 129, then the contention monitor 128 will set a status or use other appropriate means to notify the database manager 124, the operating system 122 or a human system administrator to start shutting down, delaying, suspending or in some way inhibiting non-critical accesses to the database. In preferred embodiments, the non-critical access is from database applications that cause contention. The action taken to inhibit non-critical access may include the "grey out" of non-critical application functions, either automatically or by a system administrator. As used herein to "grey out" an application function means to temporarily make a feature on the user interface unavailable. It is common in the art to show temporary unavailability of a software function by changing the icon on the user interface screen to show a faded or darkened (i.e., greyed-out) icon or menu selection.

The contention monitor 128 could continue to monitor the contention level and similarly notify when the non-critical accesses could resume once the contention level drops below the contention threshold 129 for some predetermined period of time.

In another preferred embodiment of the invention, the contention monitor 128, instead of merely notifying that the level of contention exceeds the contention threshold 129, may also indicate the detected contention level in the notification. The database manager 124, operating system 122 or human administrator could then take action to reduce the level of contention. For example, the database manager 124 could have some functions disabled earlier than others depending on the contention level received from the contention monitor 128.

In another preferred embodiment, the contention monitor 128 is incorporated into the database manager 124 shown in FIG. 1. Thus, instead of stand alone software, the contention monitor 128 is fully integrated with the database manager 124. This allows the database manager 124 to directly monitor the contention level in the database 123. The database manager 124 could set up priorities for individual SQL statements and when contention status flags are set or the contention level is above the contention threshold 129, queries could be run according to their priority ranking given the current contention level. Thus, applications would run normally as long as the contention level is less than the contention threshold 129, and then when a contention level that exceeds the contention threshold 129 is reached, non-critical SQL (i.e., low priority) statements would not be executed, and a code could be returned to the application indicating why the query was not run. Alternatively, the database manager 124 could suspend the non-critical query for a period of time rather than not execute it. Thus generally, in this embodiment, individual SQL statements are flagged with a priority level such that when a specific condition is met, and some low-priority statements are not allowed to execute or are delayed when the measured contention level exceeds the contention threshold 129. The specific condition taught in the preferred embodiment is database contention on inserting records, but other conditions and types of contention could also be used such as locked contention, contention on the CPU, disk drive contention, job scheduling contention, or seize contention.

In another preferred embodiment, the contention monitor 128 or some of the functions of the contention monitor 128 could be incorporated into the operating system 122 shown in FIG. 1. The operating system 122 could perform the contention monitoring function and pass a status or the contention level to application software, the database engine, or the system administrator. Further, the priority of critical and non-critical functions depending on the contention level could be used to set the priority of the processor to execute those jobs or suspend those jobs at the operating system level.

In another preferred embodiment, the functions of the contention monitor 128 are incorporated into the database manager 124 and the database application 126 combined. In this embodiment, longer running or high contention-causing application components are flagged or assigned to check with the database to determine if contention levels are acceptable before being allowed to run. The database manager 124 could give an explicit permission to run the database application 126, or the database application could access the contention level determined by the database manager and then the database application could be programmed to only proceed if contention levels are acceptable.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 4:
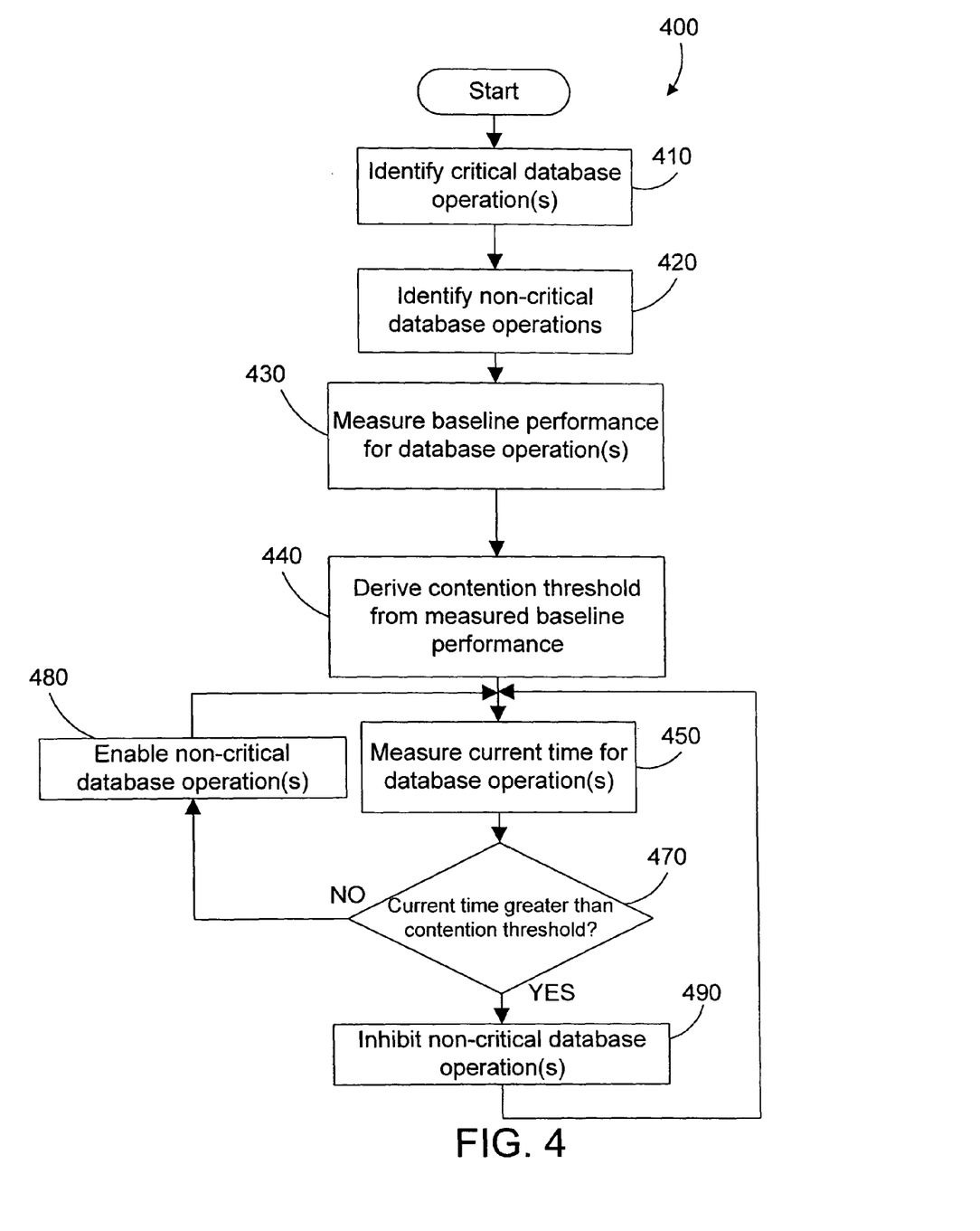
FIG. 4 shows a general method in accordance with the preferred embodiments for recognizing contention and inhibiting non-critical database access.

A method 400 in FIG. 4 shows the steps to monitor contention according to an embodiment of the present invention. Method 400 first identifies critical database operations (step 410) and non-critical database operations (step 420). Note that steps 410 and 420 may be performed by explicitly performing one of these steps, which allows inferring the other. Method 400 then measures a baseline performance for a database operation (step 430). The measured baseline performance is then used to derive a contention threshold 129 (step 440). This contention threshold 129 can be determined in any suitable manner as described above. Method 400 then measures the current time for the database operation (step 450). When measuring the time for the monitored operation in step 450, an average time for several iterations of the database operation may be used. After determining the current time for the database operation (step 450), method 400 then compares (step 470) the current time for the database operation in step 450 with the contention threshold 129 determined previously (see step 440). If the current time is less than the contention threshold 129 (step 470=no), then non-critical database operations can be enabled (step 480), and method 400 then loops back to step 450. If the current time is more than the contention threshold (step 470=yes), then non-critical database operations are inhibited (step 490). Note that step 490 may include notification that can take one of several forms as described above. The method 400 then returns to step 450 and continues.

Figure 5:
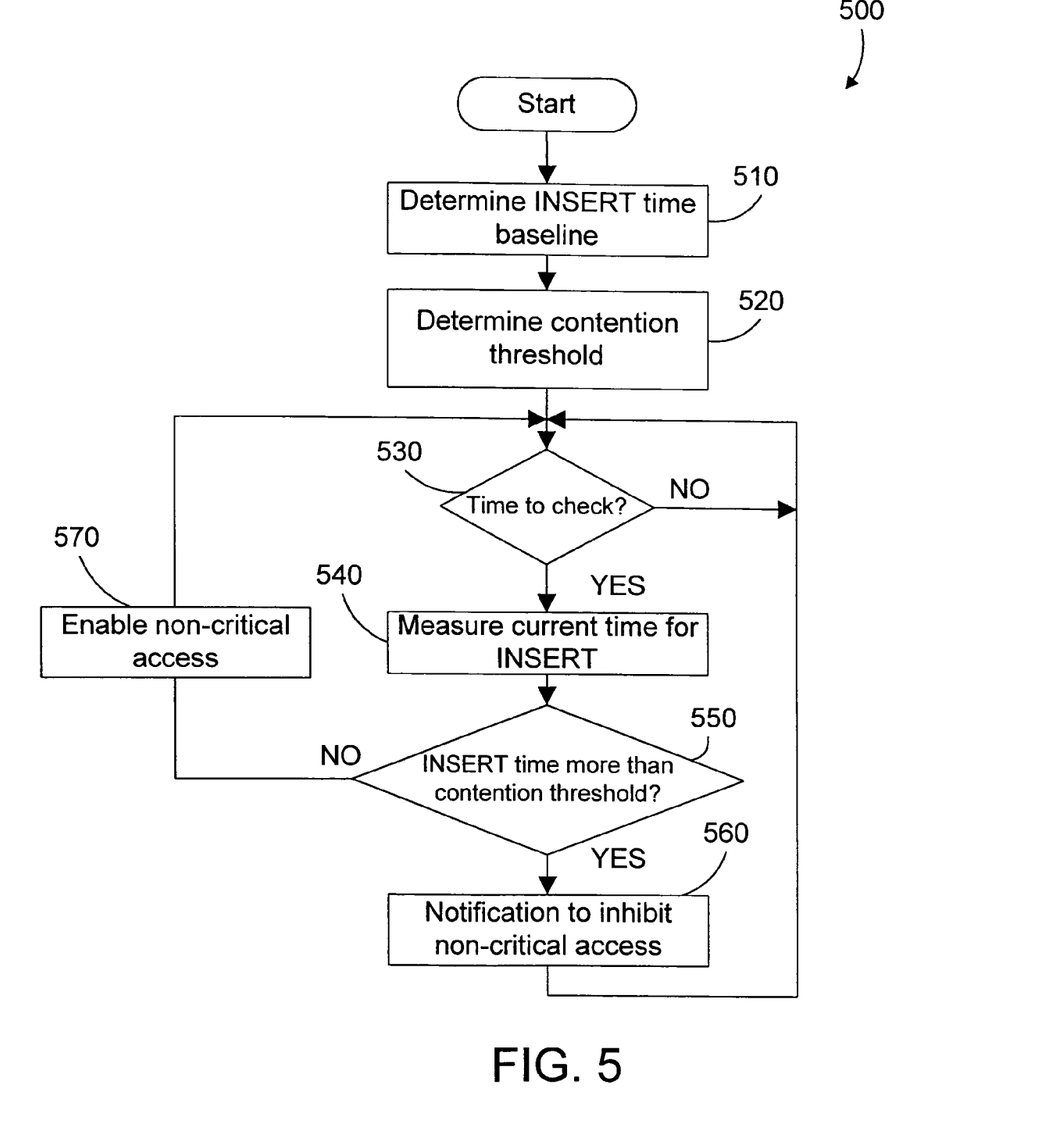
FIG. 5 shows a specific method in accordance with the preferred embodiments for recognizing contention and inhibiting non-critical database access.

A method 500 in FIG. 5 shows the steps to optimize database access according to an embodiment of the present invention. Method 500 first determines a baseline time for an INSERT operation or query (step 510). The baseline time is then used to determine the contention threshold 129 (step 520). This contention threshold 129 can be determined in any suitable manner as described above. The method then begins a loop, checking to see if it is time to check for contention (step 530). This may be done with a software or hardware timer that has a set time, is configured by the administrator, or is set by some other software process. If it is not time to check the contention level (step 530=no), method 500 loops back to step 530 until it is time to check the contention level (step 530 yes).

When it is time to check for contention (step 530=yes), the current time for an INSERT is measured (step 540) or an average time for several iterations is measured. After determining the current time for the INSERT (step 540), method 500 then compares (step 550) the current time for the INSERT determined in step 540 with the contention threshold 129 determined previously (see step 520). If the current time for an INSERT measured in step 540 is less than the contention threshold 129 (step 550=NO), then non-critical access to the database is enabled (step 570), and method 500 loops back to step 530. If the current time for an INSERT is more than the contention threshold (step 550=yes), then notification to inhibit non-critical application access is provided (step 560). The notification can take one of several forms as described above. The method then returns to step 530.

The present invention as described with reference to the preferred embodiments herein provides significant improvements over the prior art. In preferred embodiments the contention monitor determines when the level of contention for accessing or inserting records in the database rises above an acceptable threshold, and inhibits some non-critical access to the database to reduce the level of contention. The present invention provides a way to reduce delays in database accesses caused by contention and thereby improve system performance, particularly in large data warehousing environments where real time data querying is very important.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
at least one processor;
a memory coupled to the at least one processor;
a database residing in the memory;
a contention monitor residing in the memory and executed by the at least one processor, the contention monitor periodically measuring time for a database operation on the database and inhibiting at least one non-critical access to the database when the time is above a threshold while allowing at least one critical access to the database, wherein the inhibiting comprises notifying a system administrator to take action to inhibit the at least one non-critical access to the database.

2. An apparatus comprising:
at least one processor;
a memory coupled to the at least one processor;
a database residing in the memory;
a contention monitor residing in the memory and executed by the at least one processor, the contention monitor periodically measuring time for a database operation on the database and inhibiting at least one non-critical access to the database when the time is above a threshold while allowing at least one critical access to the database, wherein the inhibiting comprises notifying an application level program to suspend at least one function that accesses the database.

3. An apparatus comprising:
at least one processor;
a memory coupled to the at least one processor;
a database residing in the memory;
a contention monitor residing in the memory and executed by the at least one processor, the contention monitor periodically measuring time for a database operation on the database and inhibiting at least one non-critical access to the database when the time is above a threshold while allowing at least one critical access to the database, wherein the inhibiting comprises notifying a database engine to inhibit the at least one non-critical access of an application program accessing the database.

4. An apparatus comprising:
at least one processor;
a memory coupled to the at least one processor;
a database residing in the memory; and
a contention monitor residing in the memory and executed by the at least one processor, the contention monitor periodically measuring time for an INSERT operation on the database and providing notification to inhibit at least one non-critical access to the database when the time for the INSERT operation is above a threshold while allowing at least one critical access to the database.

5. The apparatus of claim 4 wherein the threshold is derived from a baseline measurement of access time for the INSERT operation during a time of normal activity on the database.

6. The apparatus of claim 4 wherein the notification notifies a system administrator to take action to inhibit the at least one non-critical access to the database.

7. The apparatus of claim 4 wherein the notification notifies an application level program to suspend at least one function that accesses the database.

8. The apparatus of claim 4 wherein the notification notifies a database engine to inhibit the at least one non-critical access of an application program accessing the database.

9. The apparatus of claim 4 wherein the inhibit comprises refusing at least one access to the database by an application level program.

10. The apparatus of claim 4 wherein the inhibit comprises suspending at least one access to the database by an application level program.

11. The apparatus of claim 4 wherein the inhibit comprises delaying at least one access to the database by an application level program.

12. The apparatus of claim 4 wherein the inhibit comprises suspending at least one function of an application level program.

13. The apparatus of claim 4 wherein the contention monitor resides in a database engine executed by the at least one processor.

14. The apparatus of claim 4 wherein individual SQL statements are flagged with a priority level such that when the measured time for the INSERT operation is above the threshold, execution of at least one SQL statement that has a low priority level is inhibited.

15. The apparatus of claim 4 wherein the contention monitor resides in an operating system executed by the at least one processor.

16. An apparatus comprising:
at least one processor;
a memory coupled to the at least one processor;
a database residing in the memory; and
a contention monitor residing in the memory and executing by the at least one processor, the contention monitor periodically measuring time for an INSERT operation on the database and providing notification to inhibit at least one non-critical access to the database when the time for the INSERT operation is above a threshold while allowing at least one critical access to the database, wherein the notification comprises at least one of:
notifying a system administrator to take action to inhibit the at least one non-critical access to the database;
notifying an application level program to disable at least one function that includes the at least one non-critical access to the database; and
notifying a database engine to inhibit the at least one non-critical access by the application level program accessing the database;
and wherein the inhibit of the at least one non-critical access to the database comprises at least one of:
refusing the at least one non-critical access to the database by the application level program;
suspending the at least one non-critical access to the database by the application level program;
delaying the at least one non-critical access to the database by the application level program; and
suspending the at least one function of the application level program.

17. A method for optimizing access time for a database query, the method comprising the steps of:
determining a baseline level of performance for a database operation;
determining a threshold level from the baseline level of performance;
monitoring a performance level for the database operation;
inhibiting at least one non-critical access to the database when the monitored performance level exceeds the threshold level while allowing at least one critical access to the database, wherein the step of inhibiting comprises the step of notifying a system administrator to inhibit the at least one non-critical access to the database.

18. A method for optimizing access time for a database query, the method comprising the steps of:
determining a baseline level of performance for a database operation;
determining a threshold level from the baseline level of performance;
monitoring a performance level for the database operation; and
inhibiting at least one non-critical access to the database when the monitored performance level exceeds the threshold level while allowing at least one critical access to the database, wherein the step of inhibiting comprises the step of notifying an application level program to suspend at least one function that accesses the database.

19. A method for optimizing access time for a database query, the method comprising the steps of:
determining a baseline level of performance for a database operation;
determining a threshold level from the baseline level of performance;
monitoring a performance level for the database operation;
inhibiting at least one non-critical access to the database when the monitored performance level exceeds the threshold level while allowing at least one critical access to the database, wherein the step of inhibiting comprises the step of notifying a database engine to inhibit the at least one non-critical access of an application program accessing the database.

20. A method for optimizing access time for a database query, the method comprising the steps of:
determining a baseline level of performance for an INSERT operation on a database;
determining a threshold level from the baseline level of performance;
monitoring a performance level for the INSERT operation; and
providing notification to inhibit at least one non-critical access to the database when the monitored performance level exceeds the threshold level while allowing at least one critical access to the database.

21. The method of claim 20 wherein the baseline level of performance is determined during a time of normal activity on the database.

22. The method of claim 20 wherein the notification notifies a system administrator to inhibit the at least one non-critical access to the database.

23. The method of claim 20 wherein the notification notifies an application level program to suspend at least one function that accesses the database.

24. The method of claim 20 wherein the notification notifies a database engine to inhibit the at least one non-critical access of an application program accessing the database.

25. The method of claim 20 wherein the inhibit comprises refusing at least one access to the database by an application level program.

26. The method of claim 20 wherein the inhibit comprises suspending at least one access to the database by an application level program.

27. The method of claim 20 wherein the inhibit comprises delaying at least one access to the database by an application level program.

28. The method of claim 20 wherein the inhibit comprises suspending at least one function of an application level program.

29. A method for optimizing access time for a database query, the method comprising the steps of:
determining a baseline level of performance for an INSERT operation on a database;
determining a threshold level from the baseline level of performance;
monitoring a performance level for the INSERT operation; and
providing notification to inhibit at least one non-critical access to the database when the monitored performance level for the INSERT operation exceeds the threshold level for the INSERT operation while allowing at least one critical access to the database, wherein the step of providing notification to inhibit comprises at least one of the steps of:
notifying a system administrator to take action to inhibit the at least one non-critical access to the database;
notifying an application level program to disable at least one function that includes the at least one non-critical access to the database; and notifying a database engine to inhibit the at least one non-critical access of by the application level program accessing the database;

and wherein the inhibit comprises at least one of the steps of:
refusing the at least one non-critical access to the database by the application level program;
suspending the at least one non-critical access to the database by the application level program;
delaying the at least one non-critical access to the database by the application level program; and
suspending the at least one function of the application level program.

30. A program product comprising:
(A) a contention monitor that periodically measures time for a database operation on a database and inhibits at least one non-critical access to the database when the time for the database operation is above a threshold while allowing at least one critical access to the database, wherein the inhibit comprises notifying a system administrator to take action to inhibit the at least one non-critical access to the database; and
(B) computer recordable media bearing the contention monitor.

31. A program product comprising:
(A) a contention monitor that periodically measures time for a database operation on a database and inhibits at least one non-critical access to the database when the time for the database operation is above a threshold while allowing at least one critical access to the database, wherein the inhibit comprises notifying an application level program to suspend at least one function that accesses the database; and
(B) computer recordable media bearing the contention monitor.

32. A program product comprising:
(A) a contention monitor that periodically measures time for a database operation on a database and inhibits at least one non-critical access to the database when the time for the database operation is above a threshold while allowing at least one critical access to the database, wherein the inhibit comprises notifying a database engine to inhibit the at least one non-critical access of an application program accessing the database; and
(B) computer recordable media bearing the contention monitor.

33. A program product comprising:
(A) a contention monitor that periodically measures time for an INSERT operation on a database and provides notification to inhibit at least one non-critical access to the database when the time for the INSERT operation is above a threshold while allowing at least one critical access to the database; and
(B) computer recordable media bearing the contention monitor.

34. The program product of claim 33 wherein the threshold is derived from a baseline measurement of access time for the INSERT operation during a time of normal activity on the database.

35. The program product of claim 33 wherein the notification notifies a system administrator to take action to inhibit the at least one non-critical access to the database.

36. The program product of claim 33 wherein the notification notifies an application level program to suspend at least one function that accesses the database.

37. The program product of claim 33 wherein the notification notifies a database engine to inhibit the at least one non-critical access of an application program accessing the database.

38. The program product of claim 33 wherein the inhibit comprises refusing at least one access to the database by an application level program.

39. The program product of claim 33 wherein the inhibit comprises suspending at least one access to the database by an application level program.

40. The program product of claim 33 wherein the inhibit comprises delaying at least one access to the database by an application level program.

41. The program product of claim 33 wherein the inhibit comprises suspending at least one function of an application level program.

42. The program product of claim 33 wherein individual SQL statements are flagged with a priority level such that when the measured time for the INSERT operation is above the threshold, execution of at least one SQL statement that has a low priority level is inhibited.

43. A program product comprising:
(A) a contention monitor that periodically measures time for an INSERT operation on a database and provides notification to inhibit at least one non-critical access to the database when the time for the INSERT operation is above a threshold while allowing at least one critical access to the database, wherein the notification comprises at least one of:
notifying a system administrator to take action to inhibit the at least one non-critical access to the database;
notifying an application level program to disable at least one function that includes the at least one non-critical access to the database; and
notifying a database engine to inhibit the at least one non-critical access by the application level program accessing the database;
and wherein the inhibit of the at least one non-critical access to the database comprises at least one of:
refusing the at least one non-critical access to the database by the application level program;
suspending the at least one non-critical access to the database by the application level program;
delaying the at least one non-critical access to the database by the application level program; and
suspending the at least one function of the application level program; and
(B) computer recordable media bearing the contention monitor.

* * * * *